United States Patent [19]

Troyk et al.

[11] Patent Number: 5,012,236
[45] Date of Patent: Apr. 30, 1991

[54] ELECTROMAGNETIC ENERGY TRANSMISSION AND DETECTION APPARATUS

[75] Inventors: Philip R. Troyk, Morton Grove; Glenn A. DeMichele, Chicago, both of Ill.

[73] Assignee: Trovan Limited, Isle of Man, United Kingdom

[21] Appl. No.: 358,310

[22] Filed: May 26, 1989

[51] Int. Cl.$^5$ .............................. H04Q 1/00; H01F 5/00
[52] U.S. Cl. ............................ 340/825.54; 340/825.72; 340/572; 343/867; 336/126
[58] Field of Search .................. 340/825.54, 825.31, 340/572, 825.34, 825.72; 343/867, 742; 455/41; 324/207.18, 207.22, 207.26; 336/125, 126

[56] References Cited

U.S. PATENT DOCUMENTS

| | | | |
|---|---|---|---|
| 3,859,624 | 1/1975 | Kriofsky et al. | 340/572 |
| 4,016,553 | 4/1977 | Novikoff et al. | 343/867 |
| 4,630,044 | 12/1986 | Polzer | 340/825.72 |
| 4,704,602 | 11/1987 | Asbrink | 340/572 |
| 4,736,452 | 4/1988 | Daniels et al. | 455/41 |
| 4,868,915 | 9/1989 | Anderson, III et al. | 340/825.72 |
| 4,922,261 | 5/1990 | O'Farrell | 343/867 |

*Primary Examiner*—Donald J. Yusko
*Assistant Examiner*—Peter Weissman
*Attorney, Agent, or Firm*—Rosenblum, Parish & Bacigalupi

[57] ABSTRACT

An electromagnetic transmission and detection apparatus comprising a transmission coil (20) for producing a high intensity electromagnetic field including one or more conductive windings (24) circumscribing a substantially polygonal volume of space having a central axis, and first and second receiver coils (22) disposed within the polygonal volume of space for receiving a low-intensity electromagnetic field transmitted from an external source. The receiver coils (22) are co-planar with the transmitter coil (20) and are disposed within the polygonal volume of the transmitter coil at positions which are polygonally, diametrical opposed to one another. The receiver coils (22) are electrically connected to each other in a differential circuit relationship such that the magnitude of electrical signals induced in the receiver coils (22) by uniform electromagnetic energy are substantially equal and opposite to one another. The differential circuit is operative to substract the electrical signals induced in the receiver coils and output a differential output signal, which is at a minimum when the two receiver coils receive approximately equal quantities of energy and is at a maximum when one of the receiver coils receives more electromagnetic energy from the external source than the other receiver coil. A display device (19) receives the differential output signal and displays a measure of the identification signal when the differential output signal is at a maximum.

32 Claims, 4 Drawing Sheets

ELECTROMAGNETIC ENERGY TRANSMISSION AND DETECTION APPARATUS

BACKGROUND OF THE INVENTION

1. Field of the Invention

The present invention relates generally to electromagnetic energy field transmission and detection systems, and more particularly to an apparatus for transmitting a high intensity uniform electromagnetic field and simultaneously detecting a localized low-intensity electromagnetic field.

2. Brief Discussion of the Prior Art

Many objects, such as houses, pets and cars, require some means of identification. Many prior methods of identification have required visual interrogation of the identifying medium to extract the identification data, such as reading numbers on houses, license plates on cars, and collar tags or brands on animals. Electronic identification tags have also been created, which can be associated with the object and electronically communicated with at a distance, such as the electronic sensing and actuator systems shown in U.S. Pat. Nos. 3,732,465 and 3,752,960.

The systems described in those patents are comprised of an active element, having a single transmitting and receiving coil, which operates by transmitting an electromagnetic field within the proximity of a passive electrical circuit, thereby inductively coupling with the passive circuit. When the passive circuit is inductively coupled with the coil, a characteristic change in the electromagnetic field is created, which is then detected by the electronics associated with the receiving coil. Although such systems remove some of the restrictions associated with the previously described visual identification systems, such system are really nothing more than electronic keys, and actually convey less information to the active element than does a visually inspectable tag.

More sophisticated electronic systems transmit a high intensity electromagnetic energy field to an electronic tag or transponder, which is thereby energized by the electrical energy carried by the magnetic field and made operative to output an identification signal which can be detected by a remotely located receiving coil. The passive tag or transponder element of some of these devices, such as described in U.S. Pat. No. 4,262,632, typically include a capacitor, which collects energy transmitted by the transmitting coil and then outputs power to the identification circuitry. Systems which utilize a sufficiently large capacitor or resident power source, such as a battery, are able to transmit identification signals over distances as large as a few yards. However, the packaging which is required to house a battery or capacitor results in the transponder being generally too large for many applications, such as identifying small animals.

In order to increase the potential utility of such electronic identification systems, recent efforts have been made to decrease the size of the transponding unit, such that it may be syringe-implanted within small animals, such as is disclosed in European Patent No. 258,415. This patent and other patented systems, such as U.S. Pat. Nos. 3,859,624, 3,689,885, 4,532,932 and 4,361,153, disclose passive elements which operate in real time and therefore do not require any type of significant energy storage means. The transmitting and receiving units of the systems, which are often referred to as interrogators or readers, typically include either a single, dual or triple coil arrangement, which is used to both transmit a high intensity electromagnetic field to the identification unit and receive an identification signal reradiated by the transponder in a low intensity electromagnetic field.

The detection range of such systems is typically very restricted since the strength of the electromagnetic field produced by the transponder drops in strength by $1/d^5$, where d is the distance between the receiving coil and the transponder coil, as the interrogator is moved away from the transponder. In fact, it has been calculated that at a distance of 6 to 8 inches the magnetic field carrying the identification signal from the transponder, in devices similar to that described in the European Patent No. 258,415, have only an estimated one billionth the strength of the magnetic field carrying the interrogation signal to the transponder. Hence, the interrogator must normally be placed in very close proximity to the transponder in order to detect the identification signal carried thereby. This limitation, of course, greatly restricts the utility of such devices, since not all objects may be so closely approached in order to be read.

Although the specification of European Patent No. 258,415 states that the system disclosed therein is operative to detect the retransmitted signal at distances on the order of inches, it has been found that devices constructed in accordance with that specification are actually incapable of obtaining such a range and are generally only effective when positioned within about an inch of the transponder. An identification device which is limited to within such a small range of operability is of limited usefulness, especially when it is desired to be used to identify large or wild animals or other objects which cannot be readily approached. In addition, such devices are also highly susceptible to interference and noise produced from other sources which affect the integrity of the detection portion of the system. This latter problem with such identification systems also increases in severity as the transponder is moved away from the interrogator, since it becomes more and more difficult to distinguish between the high intensity transmission field and the low intensity transponder field as the transponder field drops in strength.

Hence, a need has arisen for a transmission and detection system which can simultaneously transmit a high energy magnetic field, sufficient to power the transponder unit, and detect a localized retransmitted magnetic field at greater distances and with greater reliability.

SUMMARY OF THE PRESENT INVENTION

It is therefore an object of the present invention to provide a novel electromagnetic field transmission and detection system which can simultaneously transmit a high intensity magnetic field and detect a localized low intensity magnetic field.

Another object of the present invention is to provide a novel electromagnetic field transmission and detection system which can accurately detect a localized low-intensity magnetic field in the presence of a high-intensity magnetic field, or other uniform electromagnetic interference or noise.

A further object of the present invention is to provide a novel electromagnetic field transmission and detection system which is capable of accurately detecting very low-energy magnetic fields within a range of at least 6–8 inches from the low-energy field transmission source.

Briefly, a preferred embodiment of the present invention comprises a transmission coil for producing a high intensity electromagnetic field including one or more conductive windings circumscribing a substantially polygonal volume of space having a central axis, and first and second receiver coils disposed within the polygonal volume of space for receiving a low-intensity electromagnetic field transmitted from an external source. The receiver coils are co-planar with the transmitter coil and are disposed within the polygonal volume of the transmitter at positions which are diametrically opposed to one another. The receiver coils are electrically connected to each other in a differential circuit relationship such that the magnitude of electrical signals induced in the receiver coils by substantially uniform electromagnetic energy are substantially equal and opposite to one another. The differential circuit is operative to subtract the electrical signals induced in the receiver coils and output a differential output signal, which is at a minimum when the two receiver coils receive approximately equal quantities of energy and is at a maximum when one of the receiver coils receives more electromagnetic energy from the external source than the other receiver coil. A display device receives the differential output signal and displays a measure of the identification signal when the differential output signal is at a maximum.

These and other objects of the present invention will no doubt become apparent to those skilled in the art after having read the following detailed disclosure of a preferred embodiment which is illustrated in the several figures of the drawing.

DESCRIPTION OF THE PREFERRED EMBODIMENT

Figure 1:
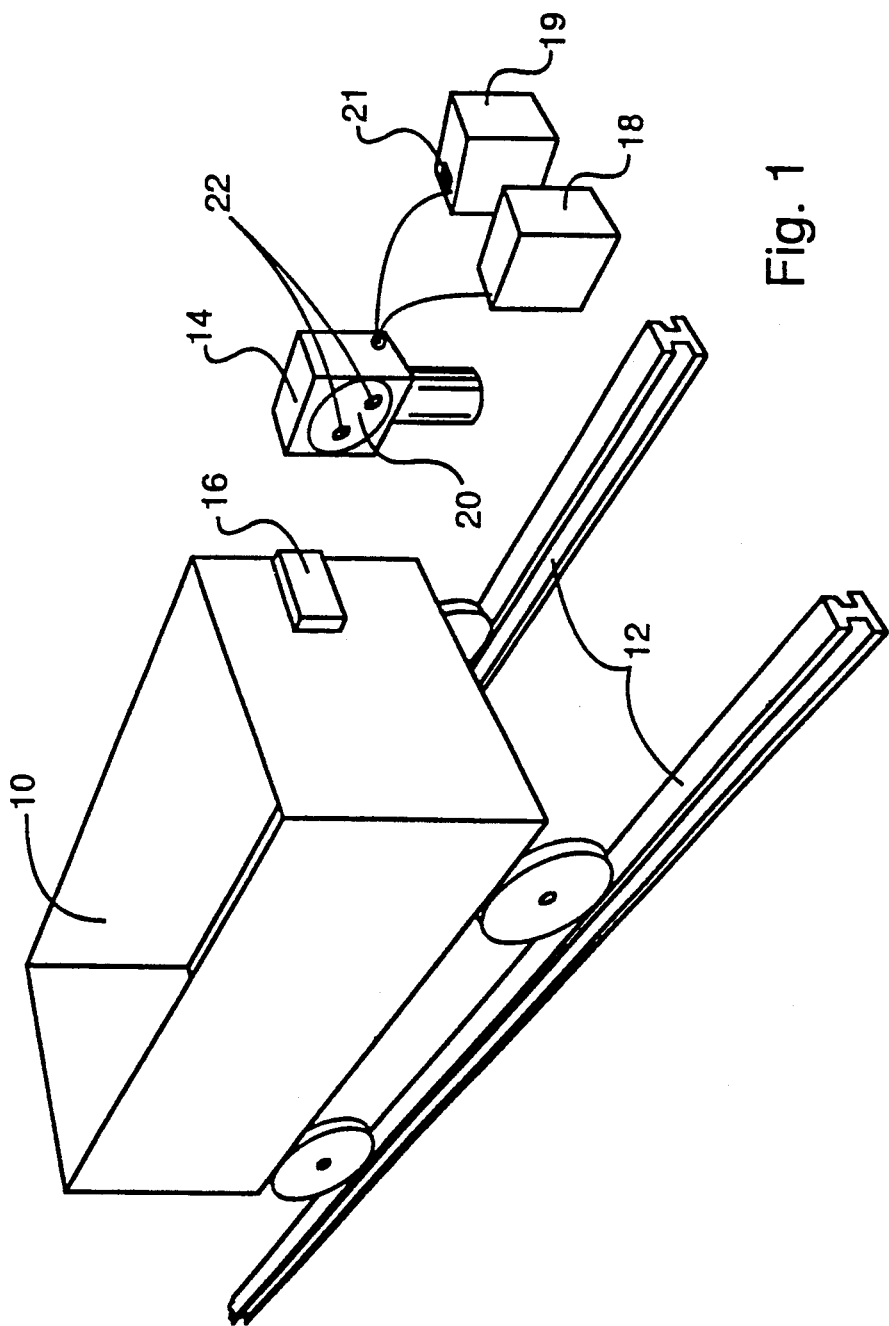
FIG. 1 is a partially-broken, perspective view of an electromagnetic transmission and detection apparatus in accordance with the preferred embodiment of the present invention.

FIG. 1 illustrates a box car 10 travelling along rail lines 12 so as to pass along the front side of a reader 14. Attached to the front of the box car is an identification box 16, which contains a data storage and transmitter device similar to those passive identification devices described in the prior art. This identification device is positioned so as to pass within close proximity of the reader 14, which contains a transmitter coil 20 for transmitting a high-intensity electromagnetic field to the identification box and two receiver coils, shown generally as 22, for receiving the low-intensity electromagnetic field retransmitted by the transmitter of the identification box 16. A generator 18 supplies power to the transmitter coil to produce the high intensity electromagnetic field. A display and storage device 19 receives the output of reader 14 for storage and display of the content of the identification signal contained therein at display 21.

Although the reader 14 is shown communicating with a passive identification device, the electromagnetic transmission and detection apparatus of the present invention could be utilized in any of a number of applications where it is necessary to accurately detect a low-intensity electromagnetic field in the presence of uniform high-intensity electromagnetic fields.

The operation of the reader 14 may be better illustrated with reference now to FIG. 2, which illustrates transmitter coil 20 and the two differential receiver coils 22 of the preferred embodiment of the present invention. The number of windings utilized to create these coils, as well as the shape of the coils, can vary significantly. In general, the coils are substantially polygonal in shape, wherein a polygon is defined to mean a figure having many sides and a circle is assumed to be comprised of numerous straight lines rather than a true circle. Hence, the windings of the coils circumscribe a substantially polygonal volume of space, and the large outer transmitter coil 20 of the reader is generally comprised of about 20 turns of copper wire 24 wound in a polygonal manner so as to create a coil having a diameter, or polygonal diameter, of about 5 to 6 inches.

In all embodiments, the transmitter coil 20 and differential receiver coils 22 are ordinarily affixed to a suitable nonconductive support structure so as to be positionable as shown in FIG. 1. Support surfaces, such as the type required to support the coils of the present invention, are well known in the art, i.e., hand-held pistol-shaped scanner structures and wand-like antennas or scanner structures, and can be constructed so as to support the coils in any of a large number of different configurations. As will be noted below, many of the alternative embodiments of the present invention will require a support structure constructed in a manner different than that depicted in FIG. 1. In this regard, it is only important to note that the support should be constructed from such a material and in such a manner so as to not significantly interfere with the passage of electromagnetic energy to or from the coils.

When sufficient power is supplied to the transmitter coil 20, such that there is more electrical energy present in the coil than can be dissipated by the resistance of the coil, substantially toroidal-shaped electromagnetic energy fields, such as the flux fields 26 and 28, will be produced. Although the electromagnetic flux fields 26 and 28 are three-dimensional in nature, circumscribe the polygonal volume of the transmitter coil, and are not bounded within the defined limits depicted in FIG. 2, these electromagnetic flux fields will be illustrated by dashed lines 26 and 28 for the sake of simplicity. It should also be noted that the basic shape of the electromagnetic flux fields will be varied depending on the positioning of the differential receiver coils 22 with respect to the transmitter coil 20, as further described below.

When a passive identification device, such as the transponder 30 of the identification box 16 is within the transmission and power range of the transmitter coil 20, some of the energy contained within the transmission fields will be transferred to the transponder 30 through inductive coupling. The voltage extracted by the transponder's receiving coil (not shown) from the transmission field can then be used to power the electrical circuitry of the transponder, and in turn cause a modulated identification signal (in the form of current) to flow through the coil of the transponder. Since the quantity of energy created by means of the inductive couple is small, and a certain quantity of that energy is utilized to operate the electronic circuitry of the transponder, the transponder coil is only capable of retransmitting a very low-intensity electromagnetic field of a highly localized nature.

As discussed above with reference to the description of the prior art, the overall operation of the transponder and its electrical circuitry are well known in the art and are described in sufficient detail in some of the prior art references referred to above.

Figure 3:
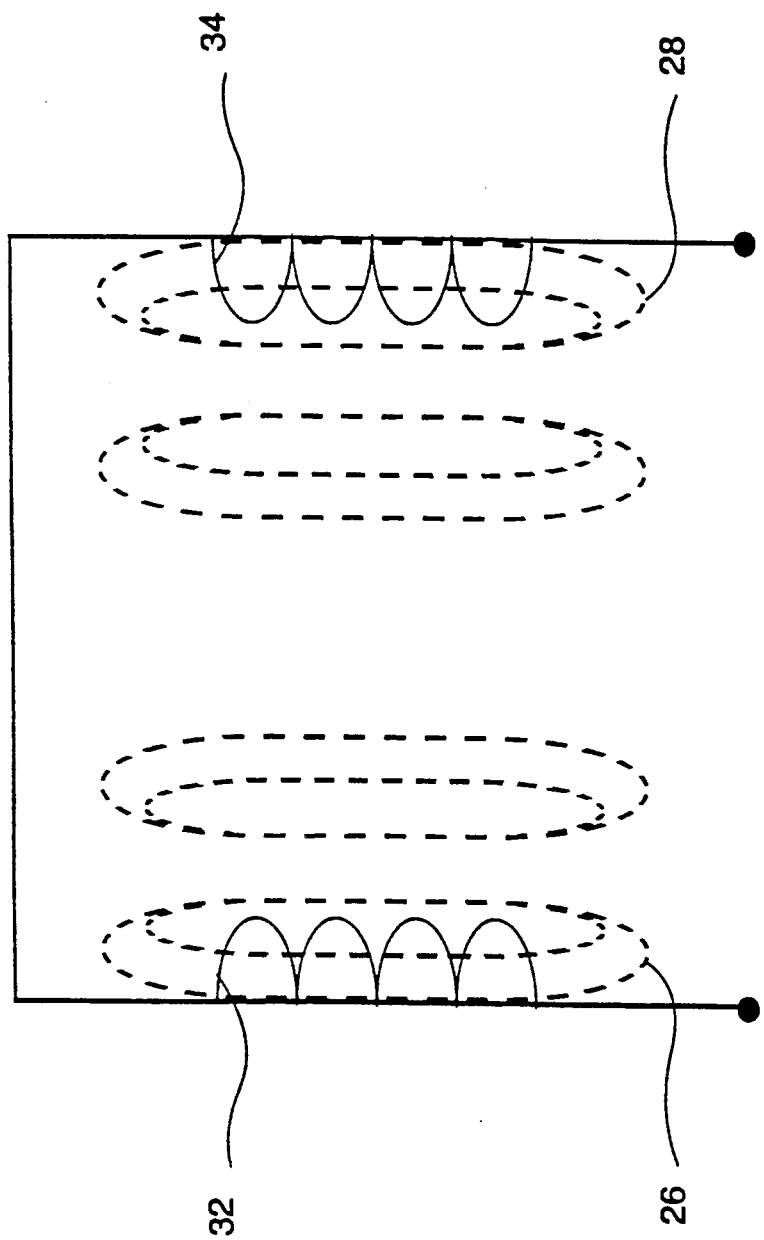
FIG. 3 is a diagram schematically illustrating the differential circuit relationship of the receiving coils of the apparatus in accordance with the preferred embodiment of the present invention.

The differential receiver coils 22 are comprised of two substantially polygonal coils 32 and 34, which are electrically connected to one another in a differential circuit relationship such that the electrical signals induced within the coils by electromagnetic energy are subtracted from one another so as to form a differential output signal. A schematic illustration of the differential coils 22 is illustrated in FIG. 3.

Receiver coils 32 and 34 are disposed within the volume space of the transmitter at significantly separated points. Preferably, the receiver coils and the transmitter coil are co-planar and the receiver coils are disposed in diametrically opposite positions. Since the receiver coils are positioned within the volume space of the transmitter coil, both receiver coils share a linking relationship with the flux fields 26 and 28. It is preferable to have the receiver coils diametrically opposed so that there is assurance that the receiver coils will be linked with substantially identical portions of the flux field, so that when the output of the receiver coils are subtracted, the difference will be close to zero.

It is also desirable to separate the receiver coils by some significant distance so that both receiving coils will not receive equally intense transmissions from the transponder. Since the strength of the transponder field drops off at the rate of $1/d^5$, separating the receiver coils will help to assure that the energy of the transponder field is primarily only received by one receiver coil. Naturally, the differential receiver coils will work if disposed in positions that are not diametrically opposed, and therefore not separated by as large of a distance. Thus, as long as the receiver coils are not positioned adjacent to one another, there should be some significant difference in the energy received by each receiver coil from the transponder.

It should also be noted that because of the related positions of the receiver coils, both coils would also generally receive approximately equal levels of substantially uniform interference energy created by other nearby transmission sources.

The positioning of the receiver coils 22 within the transmitter coil 20 is an important aspect of the present invention, in that it allows the presence of the substantially equal and opposite transmission fields, together with other substantially uniform magnetic fields, to be cancelled by the differential nature of the two coils. Hence, by differentially electrically connecting the receiver coils so as to subtract the output signals of the individual coils from one another, it is possible to produce a combined output signal which has a near zero voltage amplitude when the two coils receive approximately equal quantities of energy, and a maximum voltage amplitude when one of the coils receives more energy from an electromagnetic field than does the other receiver coil.

Alternatively, it may also be desirable in some instances to modify the range or area covered by the transmission and detection fields of the reader. Possible methods of doing this would be to modify the shape or physical configurations of the receiver coils, move the receiver coils away from the plane of the transmitter coil, or rotate the receiver coils by some angle, such that their central axes are no longer parallel to the Y-axis of the transmitter 20.

It is important to note, however, that when the receiver coils or the receiver coils position's are modified in any such manner, the electrical symmetry of the reader system must be maintained such that more of the energy of the transponder field can be intercepted by one receiver coil than the other receiver coil, or else the differential coils will not be able to accurately detect the presence of the transponder. It is also important to note that in the event that modifications cause the receiver coils to be linked with flux fields of different or variable intensities, the physical or electrical characteristics of the receiver coils can correspondingly be modified, such that even if the receiver coils are not symmetrical with respect to the energy received, the differential output signal can still be zero when both coils are exposed to substantially uniform fields.

Figure 2:
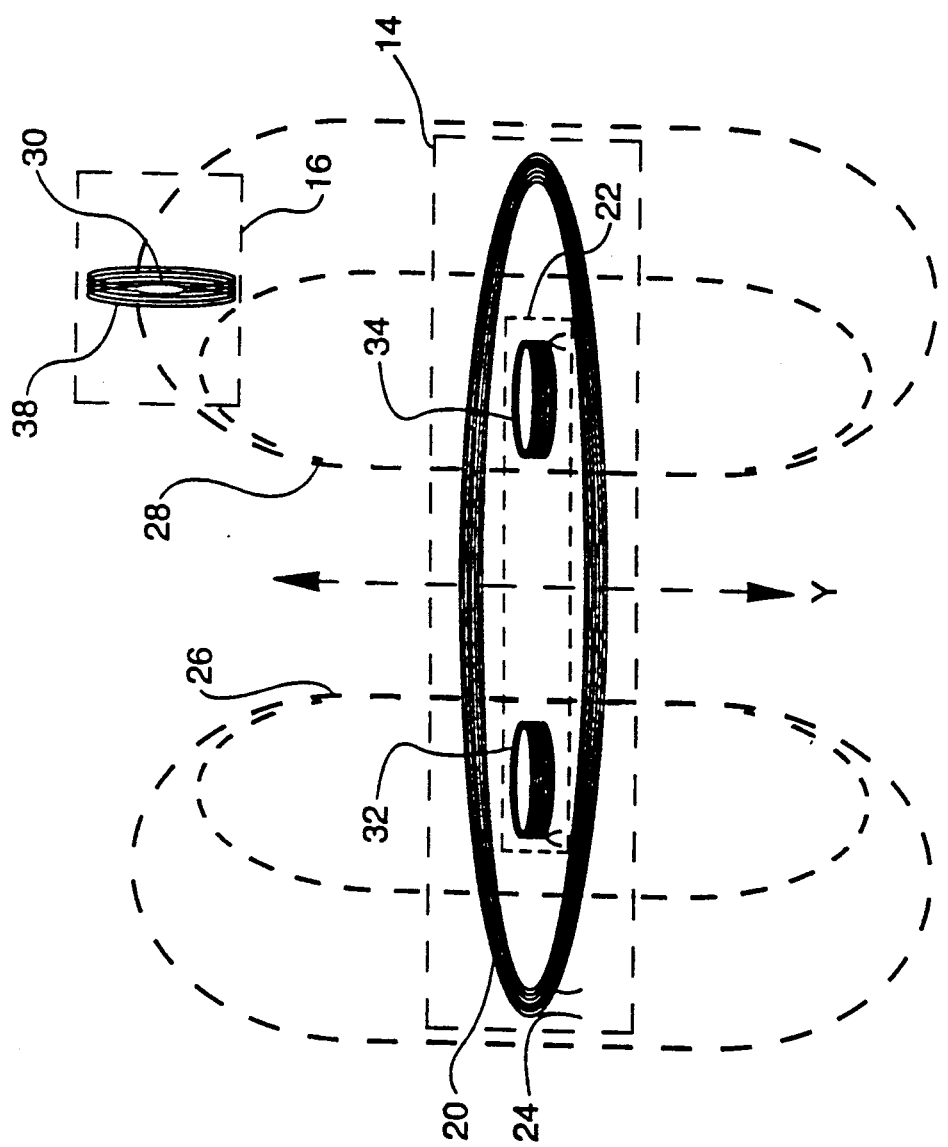
FIG. 2 is a partially-broken, perspective view of the transmission coil and receiving coils of the apparatus of FIG. 1 in accordance with the preferred embodiment of the present invention.

When the reader is configured as shown in FIG. 2, it is known that the reader 14 can accurately detect the presence of the transponder 30 at distances of up to at least 8 inches away. Once again, this increase in detection range over the prior art relates to the reader's ability to cancel out the relative presence of all but the transponder field when that field is primarily detected by only one receiver coil.

With reference to the particular arrangement of the various coils depicted in FIG. 1, the transponder 30 is positioned so as to receive the magnetic field generated by the transmitting coil 20. As previously stated, the strength of the electromagnetic field 38 retransmitted by the transponder is so small that it is effectively out of the discernable detectable range of the transmitter coil. The transponder field 38 is, however, within the detectable range of the receiving coil 34. This is true because when the difference between the output of coil 32 is taken from the output of coil 34, the amplitude of the combined output signal will be greater than zero volts by an amount which corresponds to the energy transferred by field 38, thereby indicating the presence of the transponder and allowing for detection of the modulated identification signal contained within the field 38. In other words, the placement of the two receiver coils within the cylindrical volume of space of the transmission coil creates a high sensitivity to the transponder field and a low sensitivity to the transmitter field.

In order to be sensitive to the small transponder field, the receiver coils 32 and 34 should be formed from a sufficiently large number of turns of wire, i.e., 600 turns, so as to be more sensitive to the transponder field than the transmitter coil. The polygonal diameter of the two receiver coils should also each be smaller than the diameter of the transmitter coil, although this is not an absolute requirement if electrical symmetry is maintained. In the preferred embodiment, the receiver coils 22 are each approximately 20% of the diameter of the transmitter coil. Hence, when the diameter of the transmitter coil is 5-6 inches, the diameter of the receiver coils should be approximately $\frac{3}{4}$ to $1\frac{1}{4}$ inches.

Figure 4:
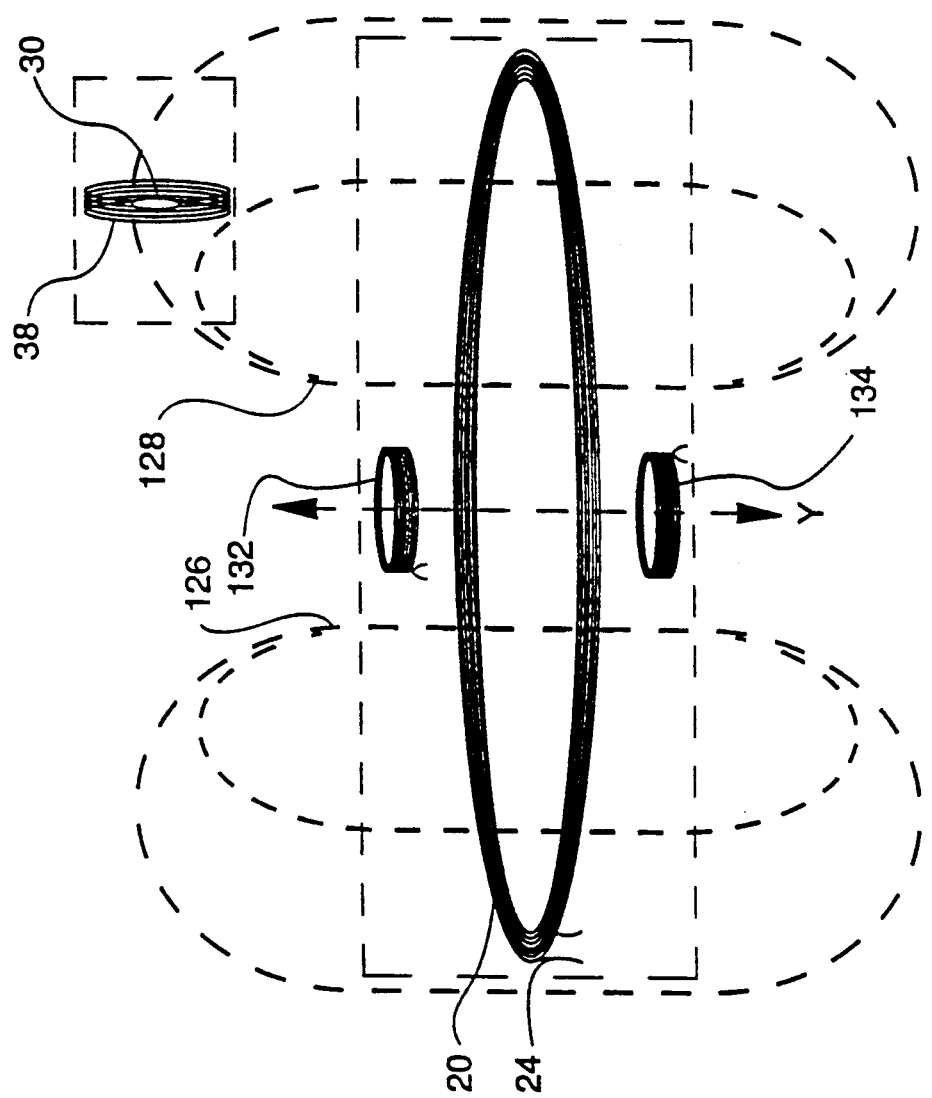
FIG. 4 is a partially-broken, perspective view of an alternative embodiment of the transmission coil and receiving coils of the present invention.

An alternative embodiment of the present invention is depicted in FIG. 4, in which the two receiving coils 132 and 134 are more or less placed on top of one another, so as to be substantially, coaxially positioned along the central axis of the transmitting coil 20. Since the transponder 30 can only be located on one side of the transmitting coil 20 at any one time, the energy of the transponder field 38 will generally only induce an electrical signal in one of the receiving coils and not the other. Because of the substantially symmetrical positioning of the receiving coils 132 and 134 about the transmitter coil 20, the receiving coils will link with substantially identical portions of the flux fields 126 and 128. Hence, the differential coil effect of the two receiving coils will allow the low intensity magnetic field of the transponder to be detected despite the presence of the high intensity transmitter fields.

It is anticipated that the two receiving coils of the present invention could also be shaped, disposed and oriented in a number of other shapes and positions within the volume space of the transmitter coil and achieve the differential detection effect described in reference to the preferred and alternative embodiments. Hence, although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. An electromagnetic transmission and detection apparatus for transmitting a high intensity electromagnetic field and detecting the presence of a low intensity electromagnetic field emanating from an external source despite the presence of said high intensity electromagnetic field, comprising:
   a support means;
   means for generating a first electrical signal for use in creating said high intensity electromagnetic field;
   a transmitter coil affixed to said support means for receiving said first electrical signal and transmitting said high intensity electromagnetic field, said transmitter coil including one or more conductive windings circumscribing a substantially polygonal volume of space having a central axis, said transmitter coil being adapted to generate a magnetic flux field within said volume;
   first and second receiver coils disposed within said volume of space at significantly separated points and adapted to have linking relationships with portions of said flux field, said first and second receiver coils being electrically connected to each other in a differential circuit relationship such that the magnitude of electrical signals induced in said first and second receiver coils by electromagnetic energy transmitted by said transmitter coil are substantially equal and opposite to each other, whereby electromagnetic energy generated by said external source and passing through at least one of said first and second receiver coils will induce an electrical signal of greater magnitude in one receiver coil than will be induced in the other receiver coil and cause a current to flow in said differential circuit which corresponds to the energy generated by said external source; and
   means responsive to said current flowing in said differential circuit and operative to indicate a measure of the energy generated by said external source.

2. An electromagnetic transmission and detection apparatus as recited in claim 1, wherein said portions of said flux field varies in intensity at said significantly separated points, and wherein said first and second receiver coils electrically compensate for variations in the intensity of said flux field.

3. An electromagnetic transmission and detection apparatus as recited in claim 1, wherein said first and second receiver coils are substantially identical in shape and have linking relationships with substantially identical portions of said flux field.

4. An electromagnetic transmission and detection apparatus as recited in claim 1, wherein said first and second receiver coils and said transmitter coil are substantially co-planar.

5. An electromagnetic transmission and detection apparatus as recited in claim 1, wherein said first and second receiver coils are disposed within said volume of space at substantially diametrically opposed points.

6. An electromagnetic transmission and detection apparatus as recited in claim 1, wherein said first and second receiver coils are each more sensitive to said low-intensity electromagnetic field than said transmitter coil.

7. An electromagnetic transmission and detection apparatus as recited in claim 1, wherein said first receiver coil includes one or more conductive windings circumscribing a first substantially polygonal volume of space having a first central axis, and wherein said second receiver coil includes one or more conductive windings circumscribing a second substantially polygonal volume of space having a second central axis.

8. An electromagnetic transmission and detection apparatus as recited in claim 7, wherein first central axis and said second central axes are substantially parallel to said central axis of said transmitter coil.

9. An electromagnetic transmission and detection apparatus as recited in claim 8, wherein said first central axis and second central axis are equidistant from said central axis of said transmitter coil.

10. An electromagnetic transmission and detection apparatus as recited in claim 7, wherein said first central axis and said second central axis are substantially coaxial.

11. An electromagnetic transmission and detection apparatus as recited in claim 7, wherein said first and second polygonal volumes of space are each smaller than said polygonal volume of space of said transmitter coil.

12. An electromagnetic transmission and detection apparatus for transmitting a high intensity electromagnetic field and detecting the presence of a low intensity electromagnetic field emanating from an external source despite the presence of said high intensity electromagnetic field, comprising:
   a structural support means;
   means for generating a first electrical signal for use in creating said high intensity electromagnetic field;
   a transmitter coil affixed to said support means for receiving said first electrical signal and transmitting said high intensity electromagnetic field, said transmitter coil including one or more conductive windings circumscribing a substantially polygonal volume of space having a central axis, said transmitter coil being adapted to generate a magnetic flux field within said volume;

a first receiver coil including one or more conductive windings circumscribing a first substantially polygonal volume of space having a first central axis;

a second receiver coil including one or more conductive windings circumscribing a second substantially polygonal volume of space having a second central axis, said first and second receiver coils disposed within said volume of space of said transmitter coil at significantly separated points and adapted to have linking relationships with portions of said flux field, said first and second receiver coils being electrically connected to each other in a differential circuit relationship such that the magnitude of electrical signals induced in said first and second receiver coils by electromagnetic energy transmitted by said transmitter coil are substantially equal and opposite to each other, whereby electromagnetic energy generated by said external source and passing through at least one of said first and second receiver coils will induce an electrical signal of greater magnitude in one receiver coil than will be induced in the other receiver coil and cause a current to flow in said differential circuit which corresponds to the energy generated by said external source; and means responsive to said current flowing in said differential circuit and operative to indicate a measure of the energy generated by said external source.

13. An electromagnetic transmission and detection apparatus as recited in claim 12, wherein said portions of said flux field varies in intensity at said significantly separated points, and wherein said first and second receiver coils electrically compensate for variations in the intensity of said flux field.

14. An electromagnetic transmission and detection apparatus as recited in claim 12, wherein said first and second receiver coils are substantially identical in shape and have linking relationships with substantially identical portions of said flux field.

15. An electromagnetic transmission and detection apparatus as recited in claim 12, wherein said first central axis and second central axis are equidistant from said central axis of said transmitter coil.

16. An electromagnetic transmission and detection apparatus as recited in claim 15, wherein said first and second receiver coils and said transmitter coil are substantially co-planar.

17. An electromagnetic transmission and detection apparatus as recited in claim 12, wherein said first central axis and second central axis are substantially coaxial.

18. An electromagnetic transmission and detection apparatus as recited in claim 12, wherein said first and second polygonal volumes of space are each smaller than said polygonal volume of space of said transmitter coil.

19. An electromagnetic transmission and detection apparatus as recited in claim 12, wherein said first and second receiver coils are each more sensitive to said low-intensity electromagnetic field than said transmitter coil.

20. An electromagnetic transmission and detection apparatus as recited in claim 12, wherein said first and second receiver coils and said transmitter coil are substantially co-planar.

21. An electromagnetic transmission and detection apparatus as recited in claim 12, wherein said first and second receiver coils are disposed within said volume of space at substantially diametrically opposed points.

22. An electromagnetic transmission and detection apparatus for transmitting a high intensity electromagnetic field to a remotely located identification transponder responsive to said high intensity electromagnetic field and operative to transmit a low intensity electromagnetic field including a modulated identification signal, and for detecting the modulated identification signal transmitted by the transponder despite the presence of the high intensity electromagnetic field, comprising:

a structural support means;

means for generating a first electrical signal for use in creating said high intensity electromagnetic field;

a transmitter coil affixed to said support means for receiving said first electrical signal and transmitting said high intensity electromagnetic field, said transmitter coil including one or more conductive windings circumscribing a substantially polygonal volume of space having a central axis, said transmitter coil being adapted to generate a magnetic flux field within said volume;

first and second receiver coils disposed within said volume of space at significantly separated points and adapted to have linking relationships with portions of said flux field, said first and second receiver coils being electrically connected to each other in a differential circuit relationship such that the magnitude of electrical signals induced in said first and second receiver coils by electromagnetic energy transmitted by said transmitter coil are substantially equal and opposite to each other, whereby electromagnetic energy generated by said external source and passing through at least one of said first and second receiver coils will induce an electrical signal of greater magnitude in one receiver coil than will be induced in the other receiver coil and cause a current to flow in said differential circuit which corresponds to said modulated identification signal transmitted by said transponder; and means responsive to said modulated identification signal and operative to display the content of said modulated identification signal.

23. An electromagnetic transmission and detection apparatus as recited in claim 22, wherein said portions of said flux field varies in intensity at said significantly separated points, and wherein said first and second receiver coils electrically compensate for variations in the intensity of said flux field.

24. An electromagnetic transmission and detection apparatus as recited in claim 22, wherein said first and second receiver coils are substantially identical in shape and have linking relationships with substantially identical portions of said flux field.

25. An electromagnetic transmission and detection apparatus as recited in claim 22, wherein said first and second receiver coils are more sensitive to said low-intensity electromagnetic field than said transmitter coil.

26. An electromagnetic transmission and detection apparatus as recited in claim 22, wherein said first and second receiver coils and said transmitter coil are substantially co-planar.

27. An electromagnetic transmission and detection apparatus as recited in claim 22, wherein said first and second receiver coils are disposed within said volume of space at substantially diametrically opposed points.

28. An electromagnetic transmission and detection apparatus as recited in claim 22, wherein said first receiver coil includes one or more conductive windings circumscribing a first substantially polygonal volume of space having a first central axis, and wherein said second receiver coil includes one or more conductive windings circumscribing a second substantially polygonal volume of space having a second central axis.

29. An electromagnetic transmission and detection apparatus as recited in claim 28, wherein first central axis and said second central axes are substantially parallel to said central axis of said transmitter coil.

30. An electromagnetic transmission and detection apparatus as recited in claim 29, wherein said first central axis and second central axis are equidistant from said central axis of said transmitter coil.

31. An electromagnetic transmission and detection apparatus as recited in claim 29, wherein said first central axis and said second central axis are substantially co-axial.

32. An electromagnetic transmission and detection apparatus as recited in claim 29, wherein said first and second polygonal volumes of space are each smaller than said polygonal volume of space of said transmitter coil.

* * * * *